United States Patent [19]

Needs

[11] 4,080,623
[45] Mar. 21, 1978

[54] COLOR TELEVISION CAMERA WITH INTERNAL REGISTRATION

[75] Inventor: Howard Curtis Needs, Eindhoven, Netherlands

[73] Assignee: U.S. Philips Corporation, New York, N.Y.

[21] Appl. No.: 728,621

[22] Filed: Oct. 1, 1976

[30] Foreign Application Priority Data

Oct. 9, 1975 Netherlands .......................... 7511841

[51] Int. Cl.² .............................................. H04N 9/09
[52] U.S. Cl. ...................................................... 358/55
[58] Field of Search ................................... 358/51, 55

[56] References Cited

FOREIGN PATENT DOCUMENTS 1,222,022 2/1971 United Kingdom .................. 358/51

Primary Examiner—Robert L. Richardson
Attorney, Agent, or Firm—Frank R. Trifari; Carl P. Steinhauser

[57] ABSTRACT

A color television camera including a plurality of camera tubes and an image registration system in which information is projected, via the beam path of the viewer, to a beam splitting optical system. A registration image is projected onto each of the camera tubes by providing a suitable end face of one of the prisms of the splitting optical system with a reflective layer or by arranging a mirror or a prism at this area.

9 Claims, 1 Drawing Figure

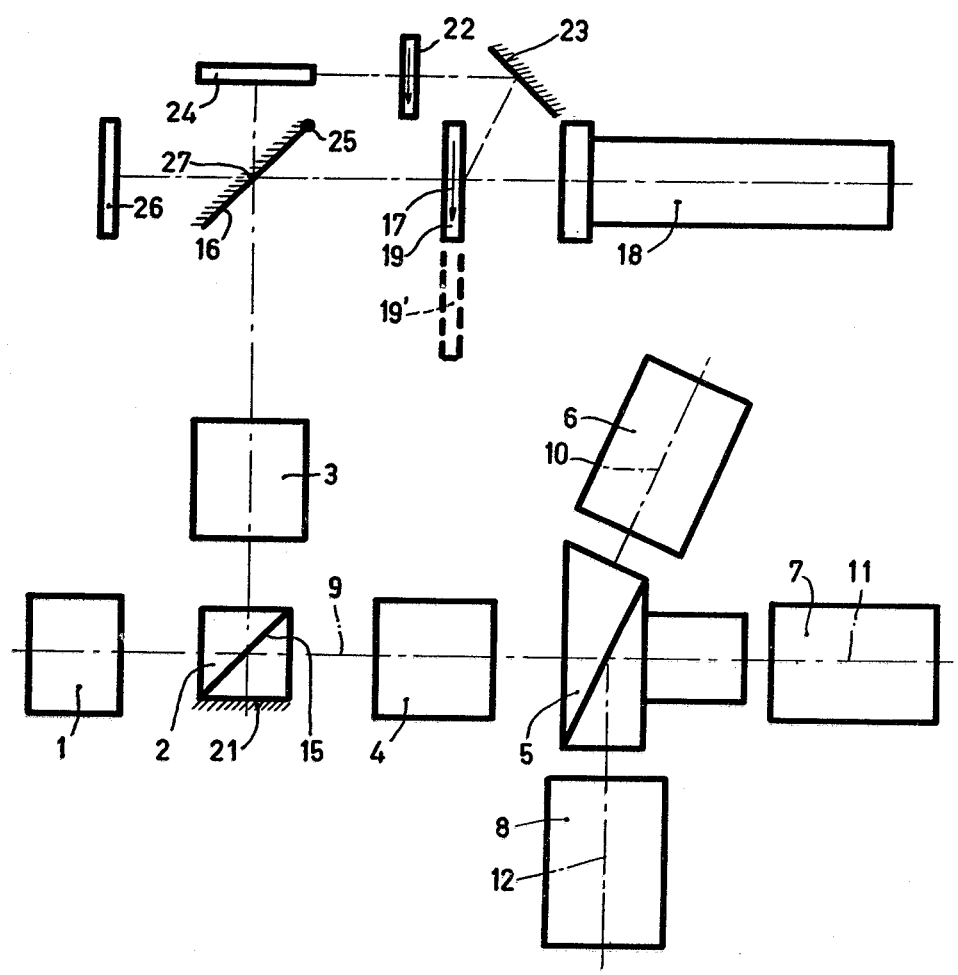

COLOR TELEVISION CAMERA WITH INTERNAL REGISTRATION

The invention relates to a television camera comprising a plurality of camera tubes, an entrance optical system, an optical view-finder and a position correction device for superposing component images of each of the camera tubes.

A television camera of this kind is known, for example, from British patent specification No. 1,351,083. In a television camera comprising a plurality of camera tubes, it is necessary for a test pattern whose image is to be scanned in each of the camera tubes to occupy a fixed position with respect to a real image to be formed by each of the camera tubes. Small shifts of the scanning rasters relative to the entrance optical system, for example, caused by radial shifts of the camera tubes or by shifts of the scanning raster in the camera tubes, can hardly be avoided. Therefore, it must be easily possible to perform the registration of the entrance images, often referred to as superposition, in the camera. For the position correction of such a camera, a test pattern must be recorded which in commonly used cameras is placed, for example, in the form of a transparency, in front of the camera or which is introduced directly via the colour splitting prism.

The invention has for its object to provide a television camera comprising a simple and reliable position correction device. To this end, a television camera of the kind set forth in accordance with the invention is characterized in that the entrance optical system comprises means for projecting a registration image of an image carrier, present in the optical device of the camera, onto each of the camera tubes.

Because in a camera in accordance with the invention a test pattern, preferably a geometrical pattern, is projected from the beam path in front of the viewer, via the entrance optical system, onto each of the camera tubes, the position correction can be simply performed without further elements being required.

In a preferred embodiment of a camera in accordance with the invention, an image-carrying element which can preferably be swung away is included in the beam path in front of the viewer, it being possible to project the said element simultaneously on all camera tubes by way of a reflective end face of one of the elements of a beam splitting block of the entrance optical system. Alternatively, use can be made of a test pattern which is positioned outside the beam path and which is selectively projected into the beam path by means of a mirror.

Some preferred embodiments in accordance with the invention will be described in detail hereinafter with reference to the drawing. The drawing diagrammatically shows a colour television camera comprising three camera tubes and means in accordance with the invention for superposing the component images.

The camera shown comprises an entrance optical system of which a zoom lens 1, a beam splitting prism 2, a viewer objective lens 3 and an image objective lens 4 are shown. Also shown is a colour splitting prism 5 which is adjoined by the input entrance windows, each of which comprises a target, of three television camera tubes 6, 7 and 8. The optical axis 9 of the entrance optical system and the electron-optical axex 10, 11 and 12 of the camera tubes are preferably situated in one plane, the electron optical axis of one of the camera tubes, in this case the camera tube 7, coinciding with the optical axis of the entrance optical system. The electron-optical axes of the camera tubes must in any case be situated in the prolongation of the three principal directions for the various colors formed by the splitting prism. Part of an entrance image, for example, 20 % is directed by a face 15 of the beam splitting prism 2 onto the viewer objective lens 3, while the remaining 80 % is applied to the image objective lens 4 for the actual display. The reflected image information is used by the viewer objective lens 3 and a mirror 16 to form an intermediate image 17 which serves as an entrance image for the viewer 18. In accordance with the invention, a test pattern 19 can be introduced at the area of the intermediate image 17. This can be effected, for example, in the form of a transparency which is provided with a test pattern and which can preferably be swung away, or in the form of a frosted transparency on the side of which a test pattern can be projected. It need not be possible to swing this transparency away, but this is to be preferred to ensure unimpeded passage of the real image. For projecting this test pattern onto the camera tubes it is sufficient in accordance with the invention to provide a face 21 of the beam splitting prism 2 with a reflective layer.

Thus, the splitting system is not only used to direct part of the entrance light onto the viewer, but also for projecting a test pattern onto the camera tubes. During the adjustment of the camera, preferably first the camera tube geometry is adjusted, so that a properly focussed upright image is formed thereon with a main lens which is set at infinity and a focus lens which is also set at infinity. The targets of the camera tubes thus coincide with the three component images formed by the entrance optical system at the color splitting prism. Subsequently while preferably the image entrance of the camera is closed, the viewer is optimally adjusted with respect to the camera tubes and with respect to the beam splitting optical system by means of the test image which is then in the active position 17; use is then made of an image of the test pattern which is imaged very well by the viewer. For the test pattern use can be made of any suitable scene. For the test pattern and for the method of adjustment reference is made to U.S. Pat. No. 3,700,789. In cameras where it is not easy to provide the face 21 of the beam splitting prism with a reflective layer for practical reasons, a separate mirror can be arranged at this area. The face 21 must then be ground smoothly and it must be suitably transparent, while the reflective face must be adjusted. Alternatively, a prism can be arranged in the vicinity of the face 21, the same conditions then being applicable as for the mirror.

In a further preferred embodiment of a television camera in accordance with the invention, the test pattern is introduced, for example, from a position 22 by means of a mirror 23. At the position of the transparency 17 which carries the test pattern information, only a blank transparency, for example, a perspex plate, must then be provided. Instead of introduction via the mirror 23, a fiber optical system can also be used. The transparency need no longer be arranged so that it can be swung away.

In a modified embodiment, the test pattern is introduced from a position 24. If the projection is optically suitably adjusted, no transparency need be included in the beam path in front of the viewer. The mirror 16 is constructed so that it can be swung away in this embodiment, preferably about an axis 25, so that the mirror interrupts the beam path in front of the viewer in the swung-out condition. The mirror can alternatively be constructed to be semi-transparent.

In a further embodiment of a camera in accordance with the invention the test image is projected from a position 26. A further transparency can then again be omitted. When the mirror 16 is arranged to be pivotable about an axis 27, it can be used for the beam passage from the splitting optical system to the viewer as well as for projecting test pattern information to the splitting optical system. Instead of the pivotable mirror, a composite prism can be used.

What is claimed is:

1. A television camera including a pick-up tube assembly comprising a plurality of camera pick-up tubes and a beam-separation assembly for directing respective image-forming beam components onto corresponding ones of said camera pick-up tubes, a viewfinder, input optical means for receiving image-forming radiation from a scene and forming corresponding images on said camera pick-up tubes and including a beam splitter arranged to direct a portion of said image-forming radiation along a first optical path terminating at said pick-up tube assembly, and a further portion of said image-forming radiation along a second optical path terminating at said viewfinder, and means including an image carrier located in an optical path within said television camera and arranged selectively to project a registration-image-forming beam along at least a part of said second optical path towards said input optical means, said input optical means being arranged to direct said projected registration-image-forming beam along said first optical path towards said pick-up tube assembly to form a registration image on each said camera pick-up tube.

2. A television camera as claimed in claim 1 in which said image carrier is located in a real image plane of said input optical means.

3. A television camera as claimed in claim 2 in which said real image plane comprises a real object plane of said viewfinder.

4. A television camera as claimed in claim 3 in which said image carrier is a transparency arranged to be displaced out of said second optical path when not required.

5. A television camera as claimed in claim 3 in which said image carrier is a translucent screen and said registration image is selectively projected onto said translucent screen from a direction inclined to the axis of said second optical path.

6. A television camera as claimed in claim 1 including means for selectively interrupting that part of said second optical path nearest to said viewfinder and to optically connect said means for projecting a registration-image-forming beam to the other part of said second optical path.

7. A television camera as claimed in claim 1 in which the beam splitter forming part of said input optical means includes a reflective element arranged to project the registration-image-forming beam from said second optical path directed by said beam splitter along said first optical path towards said pick-up tube assembly.

8. A television camera as claimed in claim 2 in which said beam splitter comprises a prism assembly having therein a partially transmissive reflecting surface inclined to the normal to the input-forming-beam axis, and said reflective element comprises a reflecting sideface to said prism assembly.

9. A television camera as claimed in claim 7 in which said reflective element is formed by a prism.

* * * * *